United States Patent
Rachabathuni et al.

(10) Patent No.: US 10,560,528 B2
(45) Date of Patent: Feb. 11, 2020

(54) CLOUD-BASED MANAGEMENT OF ACCESS TO A DATA STORAGE SYSTEM ON A LOCAL NETWORK

(71) Applicant: Western Digital Technologies, Inc., San Jose, CA (US)

(72) Inventors: Sailesh Rachabathuni, Santa Clara, CA (US); Jonathan Gaillard, San Francisco, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 63 days.

(21) Appl. No.: 15/690,068

(22) Filed: Aug. 29, 2017

(65) Prior Publication Data

US 2019/0068708 A1 Feb. 28, 2019

(51) Int. Cl.
*H04L 29/08* (2006.01)
*H04L 29/06* (2006.01)
*G06F 3/06* (2006.01)

(52) U.S. Cl.
CPC .......... *H04L 67/1097* (2013.01); *G06F 3/067* (2013.01); *G06F 3/0622* (2013.01); *G06F 3/0659* (2013.01); *H04L 63/0428* (2013.01)

(58) Field of Classification Search
CPC ............. H04L 67/1097; H04L 63/0428; G06F 3/0622; G06F 3/0659; G06F 3/067
USPC ....................................................... 709/217
See application file for complete search history.

(56) References Cited

U.S. PATENT DOCUMENTS

| | | | |
|---|---|---|---|
| 7,949,677 B2 | 5/2011 | Croft et al. | |
| 9,952,576 B2 * | 4/2018 | Griffiths | G05B 19/0426 |
| 2008/0184333 A1 | 7/2008 | McCollom et al. | |
| 2014/0108726 A1 * | 4/2014 | Laurich | G06F 21/602 |
| | | | 711/114 |
| 2014/0173027 A1 | 6/2014 | Kappes et al. | |
| 2016/0139241 A1 * | 5/2016 | Holz | H04B 17/318 |
| | | | 367/128 |
| 2016/0294938 A1 | 10/2016 | Chiriyankandath Cipson et al. | |
| 2017/0013046 A1 | 1/2017 | Flynn | |

OTHER PUBLICATIONS

International Search Report and Written Opinion dated Sep. 27, 2018 for PCT/US2018/038684.

* cited by examiner

*Primary Examiner* — Kristie D Shingles
(74) *Attorney, Agent, or Firm* — Chang & Hale LLP (57) ABSTRACT

Systems and methods are disclosed for managing access between a data storage server and a client that are on the same local network. Access is managed using a cloud service that is remote from both the data storage server and the client requesting access to the server. The cloud-based management of local connections described herein simplifies the process of connecting to a data storage server on a local network from a client program or device. Connections are authorized based on the use of a local code. The local code is generated by the cloud service and includes a concatenation of a device identifier associated with the data storage server and a time-varying value, such as a timestamp.

20 Claims, 5 Drawing Sheets

CLOUD-BASED MANAGEMENT OF ACCESS TO A DATA STORAGE SYSTEM ON A LOCAL NETWORK

BACKGROUND

Field

This disclosure relates to accessing data storage systems on local networks. More particularly, the disclosure relates to systems and methods for cloud-based access management to data storage systems on local networks.

Description of Related Art

Network-attached storage devices provide access to data over computer networks. Where a network-attached storage device is on a local area network, it may be desirable to grant access to client devices using the local area network.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the methods and systems described herein may be embodied in a variety of other forms. Furthermore, various omissions, substitutions and changes in the form of the methods and systems described herein may be made without departing from the scope of protection.

Overview

Disclosed herein are systems, devices, and methods for managing access between a network-attached storage (NAS) device and a client that are on the same local network. Access is managed using a cloud service that is remote (e.g., not on the same local network) from both the NAS device and the client requesting access to the device. This advantageously allows a centralized service to control connections to managed NAS devices while still allowing connections between devices and clients over local networks. In addition, the cloud-based management of local connections described herein simplifies the process of connecting to a NAS device on a local network from a client program or device. For example, in some embodiments, the systems and methods described herein eliminate the need for the user or client program to know or determine the local internet protocol (IP) address of the NAS device prior to connecting to it.

The disclosed cloud-based management of a connection between a NAS device and a client over a local network is accomplished using a local code, or a code that authorizes access over a local network. The local code is generated by a cloud service. The cloud service also verifies the local code when a request to connect to a NAS device is made. The authentication and authorization process for establishing a connection on a local network includes a client requests that a NAS device retrieve a local code, the NAS device requesting a local code from the cloud service, the cloud service generating the local code and sending it to the NAS device, the NAS device forwarding the local code to the client, the client requesting attachment to the NAS device using the local code as credentials, and the cloud service verifying the local code to grant access to the NAS device. The generated local code uses information associated with the NAS device in addition to other data to generate a unique local code. The local code can also be encrypted. This makes it so that the local code is difficult or impossible to generate outside of the cloud service, making it difficult to gain access to the NAS device from an unauthorized client or user.

The disclosed systems and methods for cloud-based access management may be particularly advantageous in simplifying the process for a user to connect to their NAS device. For example, it may be desirable that the first user that creates an account on a NAS device can establish a connection with the NAS device without providing authentication or authorization credentials when the connection is over a local network. However, where access to the NAS device is managed remotely (e.g., using a cloud service), the user (or client device) a problem arises in determining whether that user or client is authorized to connect to a particular NAS device. The systems and methods disclosed herein use a local code to prove that the client device and the NAS device are on the same local network, thereby allowing a connection between the devices without requiring the user to provide authorization credentials. In addition, the systems and methods disclosed herein advantageously use a cloud service to manage connection authorization rather than requiring the NAS device to perform this function. This simplifies the infrastructure of the NAS device. This also allows a centralized service to manage connections across the NAS devices that are associated with the service. Thus, a client attempting to connect to a NAS device obtains authorization through the cloud service rather than through the NAS device.

Although the principles disclosed herein may be applicable to using a cloud-based service to manage connections between devices on a local network, for clarity and ease of description, certain embodiments are disclosed herein in the context of network-attached storage systems. However, it is to be understood that the disclosed systems and methods may be used where a client device establishes a connection with a managed device on a local network. This can include, for example and without limitation, televisions, set top boxes, internet-of-things (or IOT) devices, and the like.

Network-Attached Storage

Network-attached storage (NAS) drives/systems can provide file-level, or object-level, data storage over a computer network, wherein access to the stored data is accessible to one or more clients. Although certain embodiments are disclosed herein in the context of files, file servers, file systems, and other file-level references, it should be understood that such references, as used herein, may refer to object-level data, or any other type of data structure, depending on the implementation.

Figure 1:
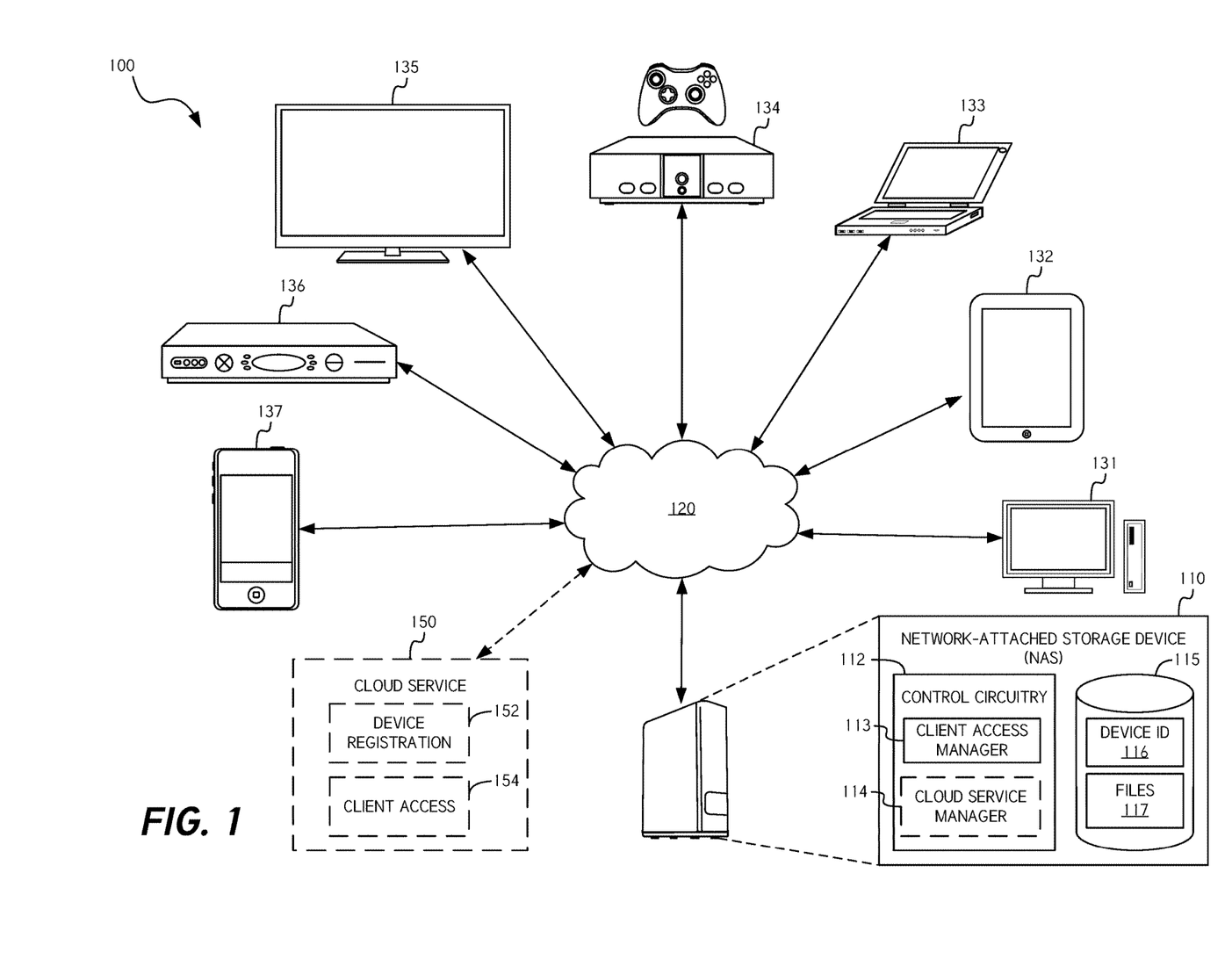
FIG. 1 is a diagram of a networked data storage system in accordance with one or more embodiments.

A NAS may include hardware, software, or a combination of such elements, configured such that the NAS operates as a file server. FIG. 1 is a diagram of an example embodiment of a NAS system 100, in which a network-attached storage device (NAS) 110 is communicatively coupled to one or more client devices 131-137 over a network 120. The NAS 110 may provide file-based, or object-based, data storage services to devices coupled to the network 120. Types of client devices that may have access to the NAS 110 can include phones 137 (such as smartphones), cable set-top boxes 136, smart TV's 135, video game consoles 134, laptop computers 133, tablet computers 132, desktop computers 131, wearable computers (not shown) and/or other network-connected computing devices. The network 120 may be a local area network (LAN), a wide area network (WAN) (e.g., the Internet), a combination of a LAN and a WAN, or other type of computer network, and the connections between the various client components of the system 100 and the network 120 may be either wired or wireless and may connect through one or more intermediate systems which are not shown for clarity purposes.

While certain embodiments are described herein in the context of NAS devices/systems, it should be understood that references herein to a NAS device may refer to other types of data storage devices/systems, such as any type of computer device implementing software allowing for data storage access over a network. Furthermore, some embodiments disclosed here may be implemented using data storage device connections that are not over a network, but rather direct client/server connection.

In certain embodiments, the NAS 110 may be configurable over the network 120 by a client device interface, such as a web browser of a mobile or desktop computing device. An operating system (e.g., a relatively low-level operating system, such as FreeNAS) may be implemented in the NAS 110 by a control circuitry 112 thereof. The NAS 110 may provide access to files 117 using one or more network file-sharing protocols, such as network file system (NFS), server message block/common internet file system (SMB/CIFS), Apple filing protocol (AFP), or the like. The NAS 110 may comprise a data store 115 for storing a device identifier (ID) 116 uniquely identifying the NAS 110, user data (e.g., files) 117, metadata, such as system tables or the like, and/or other types of data. The data store 115 may include one or more non-volatile memory devices or modules, and may include any type of data storage media (e.g., solid-state, magnetic).

The NAS 110 may be configured to implement encryption for user data/files 117 stored in the data store 115. For example, the NAS 110 may implement Transport Layer Security (TLS), Secure Sockets Layer (SSL), and/or Advanced Encryption Standard (AES) keys (e.g., 256-bit, 128-bit, etc.) to protect files in rest and/or in motion. The NAS 110 may further be configured to implement one or more additional security features, such as user verification, forward secrecy, and/or the like.

As referenced above, the NAS 110 can provide shared access to files/data 117 stored on the NAS 110. For example, any of a plurality of clients may request, over the network 120, access to a file. Access to the NAS 110 can be regulated by a cloud service 150. The cloud service 150 can receive attachment requests from one or more clients 131-137 to connect to the NAS 110. If a client is verified, the cloud service 150 grants the client access to the NAS 110.

In some embodiments, the cloud service 150 is remote from the NAS 110 and the client requesting attachment to the NAS 110 while the client and the NAS are local to one another (e.g., connected to the same LAN). When the attachment request from the client corresponds to a request to connect with the NAS 110 over a local network (e.g., a LAN), the cloud service 150 generates a local code and later verifies the local code provided by the client to grant access to the NAS 110. This advantageously allows the cloud service 150 to manage access, ownership, authorization, and authentication between clients and NAS devices rather than individual NAS devices managing these relationships.

The NAS device 110 includes a non-volatile memory module such as the data storage module 115, a network interface (not shown), and control circuitry 112 coupled to the non-volatile memory module and to the network interface. The control circuitry 112 is configured to manage client access using a client access manager 113. The control circuitry 112 is further configured to manage communication with the cloud service 150 using a cloud service manager 114. Although the control circuitry 112 is illustrated as separate modules, it should be understood that the functionality represented thereby may be implemented using any configuration of modules or control circuitry.

In some embodiments, the non-volatile memory module 115 includes computer executable instructions configured to execute one or more methods or processes (or portions of such processes and methods) described herein. In certain embodiments, the control circuitry 112 is configured to execute computer executable instructions stored on the NAS 110, the computer executable instructions configured to perform one or more of the processes or methods (or portions of such processes and methods) described herein. In some implementations, the client access manager 113 includes computer executable instructions configured to manage client access to the NAS device 110. In various implementations, the cloud service manager 114 includes computer executable instructions configured to manage communication and interaction with the cloud service 150. In various implementations, the client access manager 113 and/or the cloud service manager 114 include a combination of software, firmware, and/or hardware configured to perform the processes described herein.

The client access manager 113 is configured to receive, from a client, a request to retrieve a local code. This request is part of a process to establish a connection between the client and the NAS 110 over a local network (e.g., a LAN). The client access manager 113 is configured to verify that the request from the client is provided over a local network interface. If not, the client access manager 113 can refuse the request to retrieve the local code. In this way, the NAS 110 can be configured to regulate access by a client over a local network. If the request from the client occurs over a local network interface, then the client access manager 113 is configured to send a local code to the client that initiated request, the local code being generated by the cloud service 150.

In various implementations, a client can access the NAS 110 when the client is remote from the NAS 110 (e.g., the NAS 110 and the client are not on the same local network). However, the attachment process may involve a procedure other than the use of a local code. As described herein, the attachment process that establishes a connection between a NAS and a client over a local network involves the use of a local code.

The cloud service manager 114 of the NAS 110 is configured to register the NAS 110 with the cloud service 150. To register the NAS 110, the cloud service manager 114 provides the device ID 116 corresponding to a unique device identifier associated with the NAS 110. The cloud service manager 114 can be configured to provide the local IP address of the NAS 110 to the cloud service 150. This allows the cloud service 150 to manage access to remote NAS devices. The cloud service manager 114 is also configured to request a local code from the cloud service 150 when a request for a local code is initiated by a client over a local network interface. The cloud service manager 114 is also configured to receive the requested local code from the cloud service 150.

The cloud service 150 is configured to maintain associations between clients and NAS device. The cloud service 150 can be installed on one or more machines (e.g., servers) and may be provided by a distributed computing system. The term cloud as used herein in conjunction with the cloud service 150 is used to indicate that the cloud service 150 is accessible to NAS devices and clients over the network 120 but the cloud service 150 is not restricted to being implemented on a single destination computer or server. Rather, the cloud service 150 can be implemented on a plurality of computing devices (e.g., servers) where individual computing devices may provide all of the services of the cloud service 150 or the services of the cloud service 150 are divided among two or more computing devices. It should also be understood that the cloud service 150 can be distributed among multiple computing devices that are geographically separated to enable network communication with less latency for geographically separated clients and NAS devices.

The cloud service 150 includes a device registration module 152 and a client access module 154. Similar to the NAS device 110, the cloud service 150 can include a non-volatile memory module, a network interface, and control circuitry coupled to the non-volatile memory module and to the network interface. The control circuitry can be configured to manage available NAS devices using the device registration module 152 and to manage client access using the client access module 154. Although the control circuitry of the cloud service is described as separate modules, it should be understood that the functionality represented thereby may be implemented using any configuration of modules or control circuitry.

In some embodiments, the non-volatile memory module of the cloud service 150 includes computer executable instructions configured to execute one or more methods or processes (or portions of such processes and methods) described herein. In certain embodiments, the control circuitry is configured to execute computer executable instructions stored on the cloud service 150, the computer executable instructions configured to perform one or more of the processes or methods (or portions of such processes and methods) described herein. In some implementations, the client access module 154 includes computer executable instructions configured to manage attachment between clients and NAS devices. In various implementations, the device registration module 152 includes computer executable instructions configured to manage NAS devices that are available to clients. In various implementations, the device registration module 152 and/or the client access module 154 include a combination of software, firmware, and/or hardware configured to perform the processes described herein.

The device registration module 152 is configured to receive a device ID from the NAS 110 to register the device. The device registration module 152 can also be configured to receive an IP address of the NAS 110 to add to the registration information associated with the NAS 110. The device registration module 152 can do this for a plurality of NAS devices to regulate and to provide access to the NAS devices.

The client access module 154 is configured to manage attachments between clients and NAS devices. The client access module 154 is configured to receive an attachment request from a client, the attachment request being a request to establish a connection between the client and a particular NAS device over a local network. When that request is received, the client access module 154 is configured to determine whether the client is local to the NAS device. This determination is made using a local code. As part of the attachment request, the client provides a local code that the client access module 154 is configured to verify prior to allowing the connection to be established. This local code is generated by the client access module 154.

The client access module 154 generates the local code using the device ID of the NAS device. In some embodiments, the client access module 154 generates the local code by concatenating the device ID with a timestamp or other unique, random, or varying data value. In various implementations, the local code can also be encrypted by the client access module 154. Encryption can be any suitable symmetric (e.g., AES encryption) or asymmetric encryption. The client access module 154 stores a copy of the generated local code for verification purposes. When the attachment request is received from the client, the client access module 154 compares the local code provided by the client with the local code associated with the particular NAS device that the module generated. In some embodiments, the client access module 154 is configured to decrypt the local code provided by the client as part of the attachment request. Due at least in part to the local code being uniquely generated by the client access module 154, if the local code provided by the client is verified, that provides sufficient proof that the client is authorized to attach to the requested NAS device. This eliminates the need for further authentication or authorization requests to the client or to the user.

Individual clients 131-137 can include a non-volatile memory module, a network interface, and control circuitry coupled to the non-volatile memory module and to the network interface. The control circuitry can be configured to initiate request for a local code, to receive a local code, and to make an attachment request using the received local code. A client can be configured to communicate with the cloud service 150 to connect to the NAS 110. The request to connect, or attachment request, can include a local code to be verified by the cloud service 150. To obtain the local code, the client initiates a request for the local code through the NAS 110. In some embodiments, the client is configured to initiate the request for the local code when it determines that the NAS 110 is on the same local network and/or when the request is accomplished using a local network interface. After initiating the request for the local code, the client receives the local code from the NAS 110. The client uses this local code in the attachment request to the cloud service 150. If the local code is verified, the client then can establish a connection to the NAS 110, thereby receiving access to the files 117 stored on the NAS 110. Using the local code can simplify this process, which may be referred to as on-boarding, relative to other processes that, for example, require a user to determine the IP address of the NAS 110 prior to establishing a connection.

In some embodiments, the NAS 110 and a client are on the same local network where that network includes a router or other similar network switching device. The router can be configured to direct data to the cloud service 150 on a wide area network (WAN) and between the client and the NAS 110 on a local area network (LAN). The router can be part of the network 120 and can be used to define the local area network. For example, devices and clients connected to the router can be considered part of the same local network. In some implementations, devices and clients that have IP addresses assigned and/or managed by a router that provides access to a WAN can be considered part of the same local network.

Device Access Control

Figure 2:
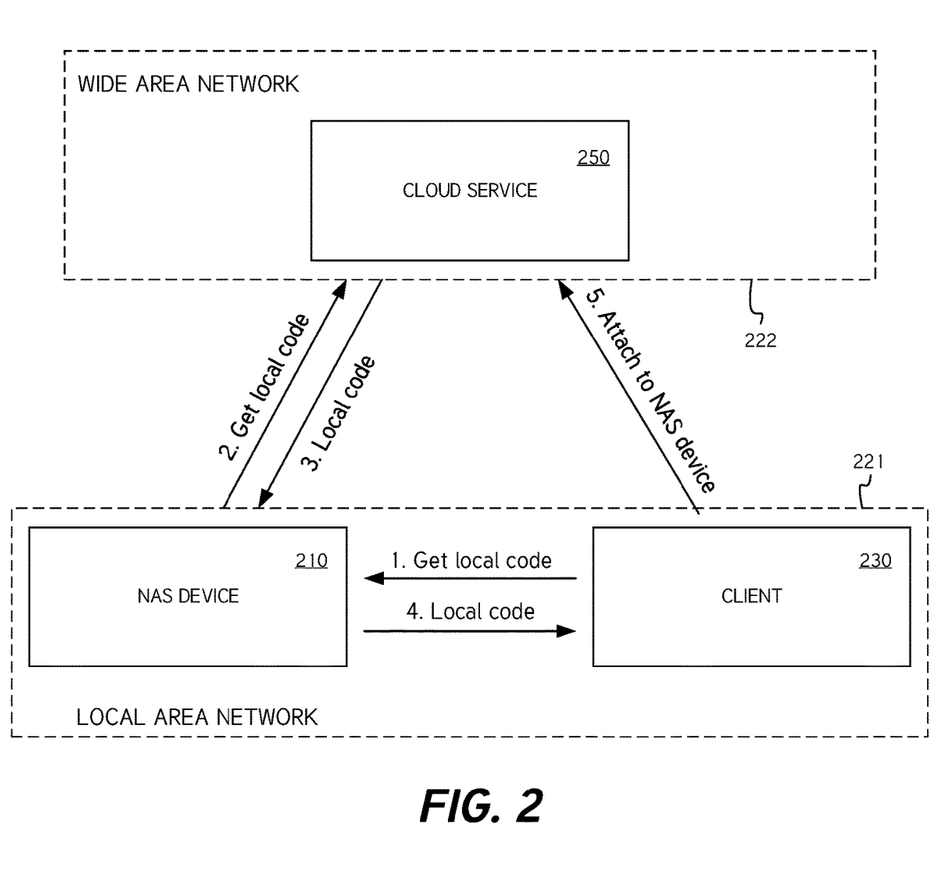
FIG. 2 is a block diagram illustrating an attachment process involving a data storage server, a client, and a cloud service in accordance with one or more embodiments.

FIG. 2 is a block diagram illustrating an attachment process involving a NAS device 210, a client 230, and a cloud service 250. The attachment process is configured to establish an attachment or connection between the NAS device 210 and the client 230 where the NAS device 210 and the client 230 are on the same local network 221. In this network configuration, the cloud service 250 is connected to the NAS device 210 and to the client 230 over a wide area network 222. In some embodiments, the connection between the client 230 and the NAS device 210 may be wired, such as through Ethernet, USB, or other connection, or may be wireless, such as through WiFi, Bluetooth, or other wireless connection. The NAS device 210 can be similar to the NAS 110 described herein with reference to FIG. 1. Likewise, the client 230 can be any one of the clients 131-137 described herein with reference to FIG. 1. In addition, the cloud service 250 can be similar to the cloud service 150 described herein with reference to FIG. 1. The communication between the client 230 and the NAS device 210, between the client 230 and the cloud service 250, and/or between the cloud service 250 and the NAS device 210 can be encrypted. This may be accomplished using any suitable encryption protocol, such as hypertext transfer protocol secure (HTTPS), secure sockets layer (SSL), transport layer security (TLS), and the like.

First, the attachment process includes an initial request from the client 230 to the NAS device 210 to retrieve a local code. In some embodiments, the client 230 is configured to make this initial request when it determines that it is on the same local network 221 as the NAS device 210. In some embodiments, the client 230 is restricted from making this initial request unless it determines that the NAS device 210 is on the same local network 221. Where the client 230 is communicatively coupled to the NAS device 210 over a LAN connection, the client 230 may be configured to search for NAS devices on the network 221, wherein such search may produce a list of all available devices based on, for example, IP address.

Second, the attachment process includes a request from the NAS device 210 to the cloud service 250 for a local code. In some embodiments, the NAS device 210 is configured to refuse the initial request from the client 230 if the initial request is not transmitted over a local network interface. Accordingly, the client 230 and/or the NAS device 210 can be configured to determine whether each is connected to the same local network 221. If not, the client 230 and/or the NAS device 210 can be configured to end the attachment process that uses a local code. In this way, this local code is available only through a network interface that is local to the local area network 221. The request for a local code does not proceed if made from a remote network (e.g., from a client or device on the wide area network 222). It should be understood that other attachment processes may be available where the NAS device 210 and the client 230 are not on the same local area network.

Third, the attachment process includes the cloud service 250 generating a local code and sending it to the requesting NAS device 210. The local code can be encrypted. The local code can be associated with a device identification of the NAS device 210. The local code can be generated using unique, random, or varying information in addition to the device identification of the NAS device 210. The cloud service 250 stores a copy of the local code for later verification and authentication. In some embodiments, the cloud service 250 concatenates the device ID of the NAS device 210 with a timestamp associated with the request for the local code or the time when the local code is generated to generate the local code. In this way, an unauthorized client is unlikely or unable to generate a duplicate or counterfeit local code to gain unauthorized access to the NAS device 210.

Fourth, the attachment process includes the NAS device 210 sending the local code to the client 230. In some embodiments, the NAS device 210 does not modify the local code. In some embodiments, further encryption can be used between the NAS device 210 and the client 230 using, for example, symmetric or asymmetric encryption techniques.

Fifth, the attachment process includes sending from the client 230 to the cloud service 250 an attachment request where the request includes the local code received from the NAS device 210. The cloud service 250 is configured to decrypt and to verify the received local code. If the local code is verified, the client 230 is authorized to connect to the NAS device 210 over the local area network 221.

The attachment process advantageously provides a way to prove to the cloud service 250 that the on-boarding client 230 is local to the NAS device 210. This allows the authorization policy to exist on the cloud service 250 rather than the NAS device 210. This allows the architecture of the NAS device 210 to be simplified. In addition, this makes the on-boarding process easier for a user due at least in part to the automatic authentication and authorization provided through the use of the local code.

The client 230 may comprise a server, a desktop, a laptop, a tablet, a handheld device, or the like, and may include control circuitry comprising one or more central processing units (CPUs), memory/data storage devices or modules, network interfaces, and/or input/output interface components, and the like. The control circuitry of the client 230 may be implemented to perform the functionality described herein. The control circuitry of the client 230 may be configured to execute certain software applications for implementing the functionality described herein. The client 230 can include one or more local storage devices, such as hard disks, flash memory modules, solid state disks, optical disks, and the like. The client 230 includes a network interface for connecting to the network 221 and the network 222, which may include one or more network adapters (e.g., network interface cards (NICs)).

Establishing a Local Connection Between a Client and a NAS Device

Figure 3:
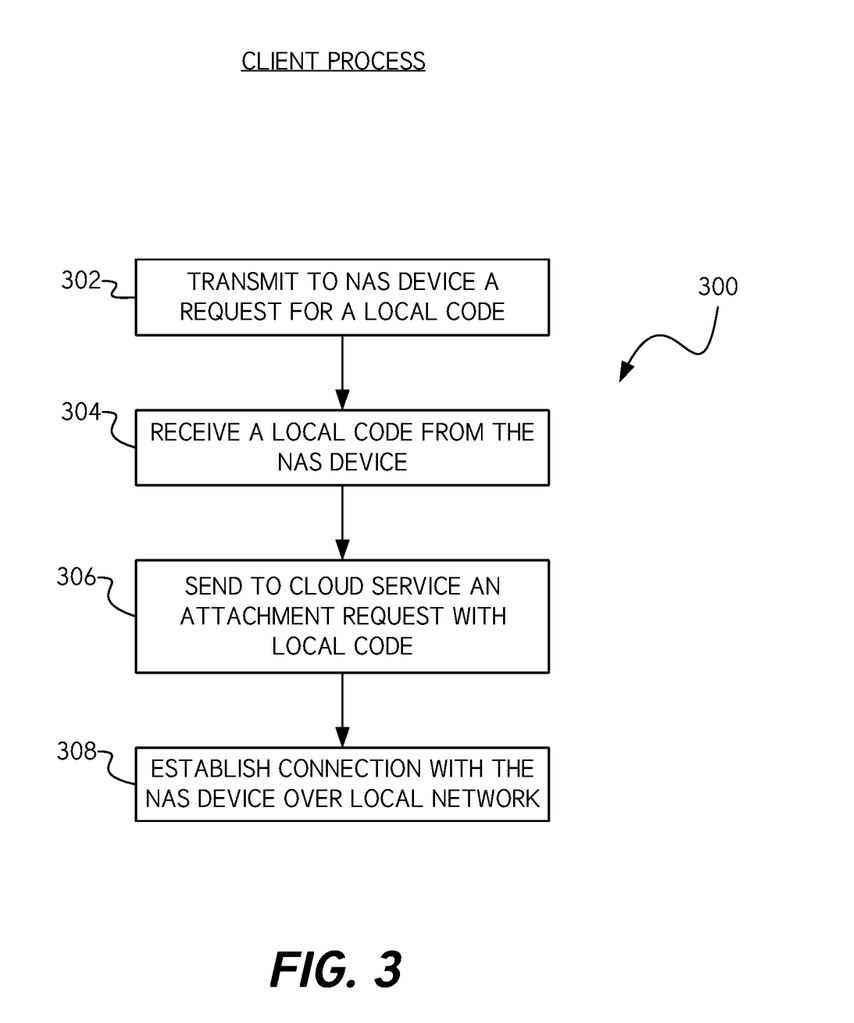
FIG. 3 is a flow diagram illustrating a process for establishing a local connection between a client and a network-attached storage (NAS) device in accordance with one or more embodiments.

FIG. 3 is a flow diagram illustrating a process 300 for establishing a local connection between a client and a NAS device in accordance with one or more embodiments. The process 300 may be implemented at least in part by a client communicatively coupled to a NAS device over a local network connection. Accordingly, for ease of description, the process 300 is described herein as being performed by the client. The process 300 allows the client to establish a connection to the NAS device without a user of the client device determining or providing the IP address or device ID of the NAS device, facilitating the on-boarding process.

At block 302, the client initiates a request for a local code by transmitting the request to a NAS device. In some embodiments, the client determines if the NAS device is on a local network with the client before initiating the request for the local code.

At block 304, the client receives a response from the NAS device that includes a local code. The local code can be encrypted when received from the NAS device or it can be unencrypted. In some embodiments, the client can decrypt the local code. The local code is uniquely associated with the NAS device. The local code can be generated using an algorithm that combines a device identifier of the NAS device (e.g., media access control (MAC) address, device ID, serial number, hash value of one or more hardware component identifiers, etc.) with a time-dependent value, such as a time stamp, random number, or the like. The resulting local code can be unique and difficult or impossible to counterfeit.

At block 306, the client sends to a cloud service an attachment request. The attachment request includes an encrypted local code. If the local code is verified, the connection between the client and the NAS device is allowed.

At block 308, the client establishes a connection with the NAS device over the local network interface. The connection allows the client to access a file system and files on stored on the NAS device using the local network.

Figure 4:
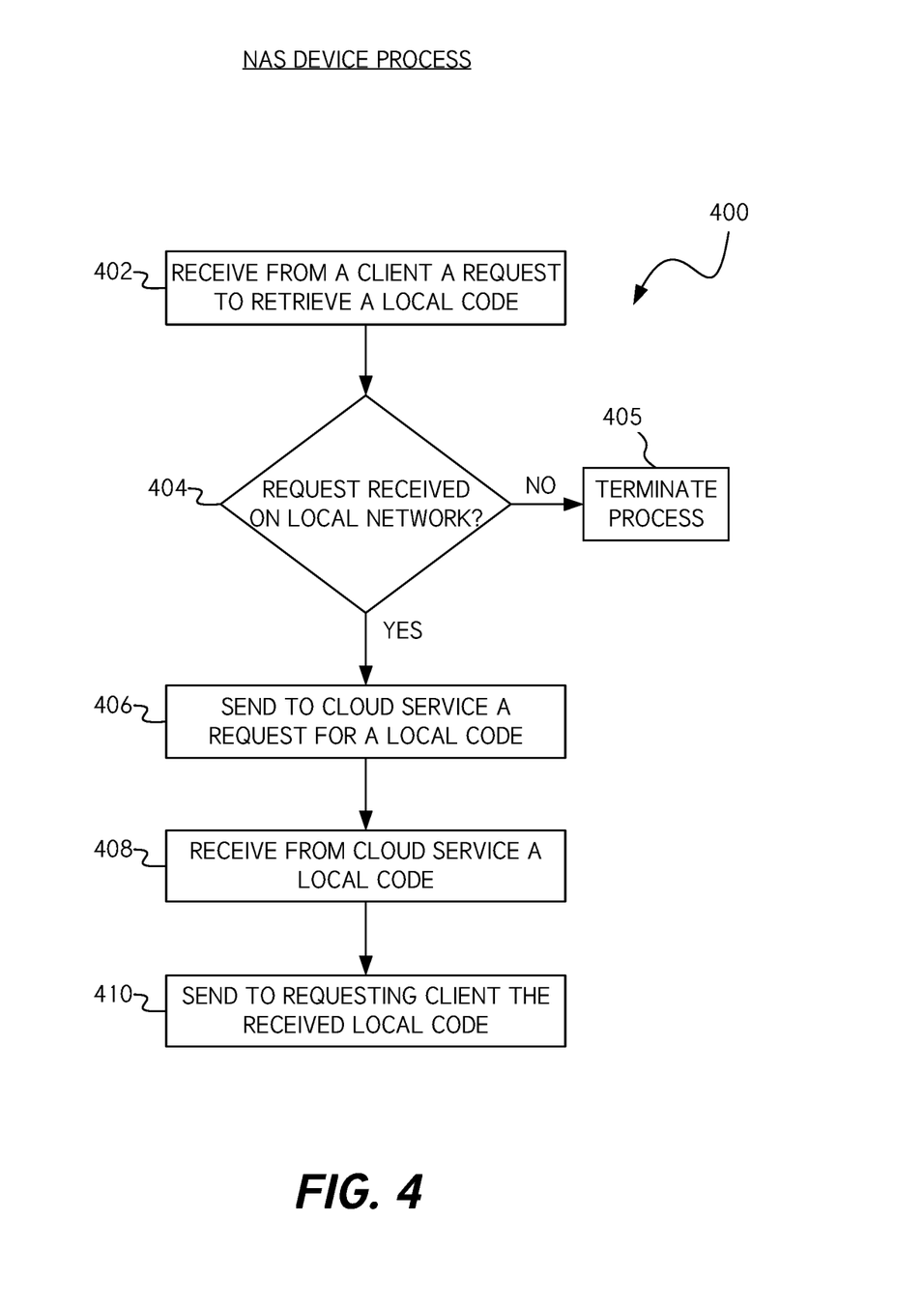
FIG. 4 is a flow diagram illustrating a process for establishing a local connection between a client and a NAS device in accordance with one or more embodiments.

FIG. 4 is a flow diagram illustrating a process 400 for establishing a local connection between a client and a NAS device in accordance with one or more embodiments. The process 400 may be implemented at least in part by a NAS device communicatively coupled to a client over a local network connection. Accordingly, for ease of description, the process 400 is described herein as being performed by the NAS device. The process 400 allows the NAS device to establish a local connection with the client without the NAS device maintaining access permissions, authenticating the client, and/or authorizing the client, making the architecture of the NAS device simpler.

At block 402, the NAS device receives from a client a request to retrieve a local code. At block 404, the NAS device determines if the request from the client was received over a local network interface. If so, the NAS device proceeds to block 406. If not, the NAS device terminates the process 400 at block 405 without requesting a local code from a cloud service.

At block 406, the NAS device requests a local code from a cloud service. At block 408, the NAS device receives a local code from the cloud service. The local code is uniquely associated with the NAS device. The local code can be generated using an algorithm that combines a device identifier of the NAS device (e.g., MAC address, device ID, serial number, hash value of one or more hardware component identifiers, etc.) with a time-dependent value, such as a time stamp, random number, or the like. The resulting local code can be unique and difficult or impossible to counterfeit.

At block 410, the NAS device sends the local code to the client that requested it. In some embodiments, the NAS device can decrypt the local code prior to sending it to the client. In various embodiments, the NAS device can encrypt the received local code for transmission to the client. This can be done to an unencrypted local code or to an encrypted local code, thereby adding another layer of encryption.

Figure 5:
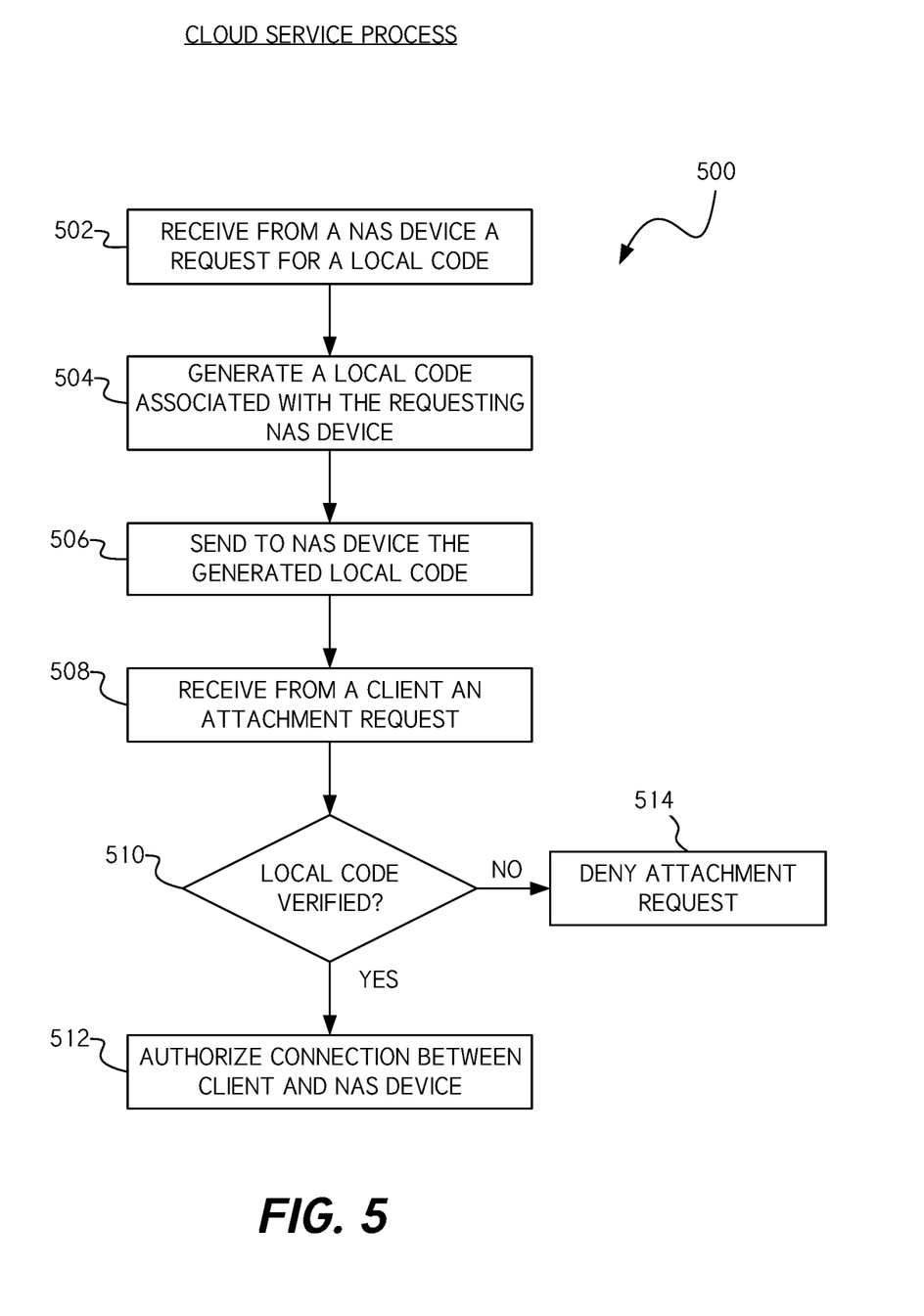
FIG. 5 is a flow diagram illustrating a process for authorizing a connection between a client and a NAS device on a local network in accordance with one or more embodiments.

FIG. 5 is a flow diagram illustrating a process 500 for authorizing a connection between a client and a NAS device on a local network in accordance with one or more embodiments. The process 500 may be implemented at least in part by a cloud service communicatively coupled to a client and a NAS device over a wide area network. Accordingly, for ease of description, the process 500 is described herein as being performed by the cloud service. The process 500 allows the cloud service to maintain device associations in a centralized and/or distributed computing environment rather than on individual NAS devices. This allows the cloud service to authorize device attachments to clients that may be unknown to the NAS device, such as paid accounts that provide access to NAS devices.

At block 502, the cloud service receives from a NAS device a request for a local code. At block 504, the cloud service generates a local code that is associated with the requesting NAS device. The local code is uniquely associated with the NAS device that requested the local code. The local code can be generated using an algorithm that combines a device identifier of the NAS device (e.g., MAC address, device ID, serial number, hash value of one or more hardware component identifiers, etc.) with a time-dependent value, such as a time stamp, random number, or the like. The resulting local code can be unique and difficult or impossible to counterfeit.

At block 506, the cloud service sends to the NAS device the local code. Prior to sending the local code, the cloud service can encrypt it using symmetric (e.g., AES encryption) or asymmetric encryption.

At block 508, the cloud service receives from a client an attachment request. The attachment request includes a local code and a targeted NAS device. At block 510, the cloud service verifies the local code by comparing it to the local code generated for the targeted NAS device. In some embodiments, the cloud service unencrypts the local code received from the client prior to verifying it. If the local code is verified, the cloud service authorizes the connection between the client and the NAS device at block 512. If the local code does not match the local code generated for the targeted NAS device, the cloud service denies the attachment request at block 514.

Additional Embodiments

Those skilled in the art will appreciate that in some embodiments, other types of concurrent file modification systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A network-attached storage device (NAS) comprising:
a non-volatile memory module;
a wide area network interface;
a local network interface; and
control circuitry coupled to the non-volatile memory module, to the wide area network interface, and to the local network interface and configured to:
receive, from a client over the local network interface, a request to retrieve a local code comprising a code generated by a cloud service that authorizes access to the client over a local network;
send, to the cloud service over the wide area network interface, a request for the local code;
receive, from the cloud service over the wide area network interface, the local code, the local code comprising a concatenation of a device identifier associated with the NAS and a time-varying value;
send, to the client over the local network interface, the local code received from the cloud service; and
provide, to the client over the local network interface, access to files stored on the non-volatile memory module responsive to an indication of successful attachment from the cloud service.

2. The NAS of claim 1, wherein the local code is encrypted using Advanced Encryption Standard (AES) encryption.

3. The NAS of claim 1, wherein the control circuitry is further configured to send, to the cloud service, the device identifier associated with the NAS.

4. The NAS of claim 1, wherein the control circuitry is further configured to send, to the cloud service, an internet protocol (IP) address of the NAS.

5. The NAS of claim 1, wherein the time-varying value is a timestamp.

6. The NAS of claim 1, wherein the control circuitry is further configured to determine that the request from the client was received over the local network interface.

7. A computing device comprising:
data storage means for storing computer executable instructions;
network interface means for connecting to a data storage server over a local network and to a cloud service over a wide area network; and
control means for controlling the data storage means and the network interface means and configured to, upon execution of the computer executable instructions:
send, to the data storage server using the network interface means, a request for a local code comprising a code generated by a cloud service that authorizes access to the data storage server over the local network;
receive, from the data storage server, the local code, the local code comprising a concatenation of a device identifier associated with the data storage server and a time-varying value;
send, to the cloud service over the wide area network, an attachment request with the local code; and
establish, responsive to an indication from the cloud service that the attachment request succeeded, a connection with the data storage server using the network interface means such that the computing device is provided access to files stored on the data storage server.

8. The computing device of claim 7, wherein the control means is further configured to encrypt communication with the cloud service.

9. The computing device of claim 7, wherein the time-varying value is a timestamp.

10. The computing device of claim 7, wherein the control means is further configured to determine an internet protocol (IP) address of the data storage server on the local network.

11. A cloud service communicatively coupled over a wide area network to a data storage server and to a client device, the cloud service comprising:
a non-volatile memory module;
a network interface; and
control circuitry coupled to the non-volatile memory module and to the network interface and configured to:
receive, from the data storage server, a request for a local code comprising a code generated by the cloud service that authorizes access between the data storage server and the client device over a local network;
generate the local code based at least in part on a concatenation of a unique device identifier associated with the data storage server and a time-varying value;
send, to the data storage server, the generated local code;
receive, from the client device, an attachment request that includes an offered local code;
verify that the offered local code matches the generated local code; and
authorize a connection over a local network between the data storage server and the client device by sending an attachment success indication to the client device thereby allowing the client device access to files stored on the data storage server.

12. The cloud service of claim 11, wherein the control circuitry is further configured to deny the attachment request responsive to the offered local code not matching the generated local code.

13. The cloud service of claim 11, wherein the control circuitry is further configured to receive, from the data storage server, the unique device identifier associated with the data storage server.

14. The cloud service of claim 11, wherein the control circuitry is further configured to encrypt the generated local code.

15. The cloud service of claim 14, wherein the control circuitry is configured to encrypt the generated local code using a symmetric encryption algorithm.

16. The cloud service of claim 11, wherein the time-varying value is a timestamp associated with the generation of the local code.

17. The cloud service of claim 11, wherein the control circuitry is further configured to store the generated local code.

18. The cloud service of claim 11, wherein the control circuitry is further configured to receive unique device identifiers from a plurality of data storage servers.

19. The cloud service of claim 18, wherein the control circuitry is further configured to generate unique local codes for each of the plurality of data storage servers based at least in part on the unique device identifiers.

20. The cloud service of claim 11, wherein the attachment request further includes an indication of a targeted data storage server.

* * * * *